(12) United States Patent
Hoppe et al.

(10) Patent No.: US 7,966,634 B2
(45) Date of Patent: Jun. 21, 2011

(54) METHOD AND APPARATUS FOR INFORMATION EXCHANGE IN AN INTERACTIVE COMMUNICATION SYSTEM USING TV BROADCAST INFORMATION

(75) Inventors: Edgar Hoppe, Wolfsburg (DE); Henning Bloch, Braunschweig (DE); Melanie Knoop, Meine (DE); Jürgen Briam, Wolfsburg (DE); Carsten Janz, Wolfsburg (DE); Peter Bobrowski, Wendeburg (DE); Clemens Goeke, Wolfsburg (DE); Kerstin Nowak, Wolfsburg (DE); Sandra Schurz, Vordorf (DE); Heiko Thoms, Edemissen (DE)

(73) Assignee: Volkswagen AG, Wolfsburg (DE)

( * ) Notice: Subject to any disclaimer, the term of this patent is extended or adjusted under 35 U.S.C. 154(b) by 1217 days.

(21) Appl. No.: 10/694,314

(22) Filed: Oct. 27, 2003

(65) Prior Publication Data

US 2004/0139174 A1  Jul. 15, 2004

(30) Foreign Application Priority Data

Oct. 29, 2002  (DE) .................................. 102 50 356
Jul. 1, 2003    (DE) .................................. 103 30 362

(51) Int. Cl.
| | |
|---|---|
| H04N 7/20 | (2006.01) |
| H04N 7/173 | (2011.01) |
| H04N 7/16 | (2011.01) |
| H04N 7/14 | (2006.01) |
| H04N 5/222 | (2006.01) |
| H04L 12/16 | (2006.01) |
| H04H 20/74 | (2008.01) |

(52) U.S. Cl. ............ 725/70; 725/63; 725/105; 725/122; 725/135; 348/14.08; 348/722; 370/260; 455/3.02

(58) Field of Classification Search .................. 725/135, 725/63, 70, 105, 122; 348/14.08, 722; 370/260; 455/3.02
See application file for complete search history.

(56) References Cited

U.S. PATENT DOCUMENTS

| 5,828,839 A | 10/1998 | Moncreiff ................ 395/200.34 |
| 6,259,442 B1 | 7/2001 | Britt, Jr. et al. ................ 345/327 |
| 6,351,270 B1 | 2/2002 | Nishikawa et al. ........... 345/717 |
| 6,526,580 B2 * | 2/2003 | Shimomura et al. ............ 725/63 |

(Continued)

FOREIGN PATENT DOCUMENTS

JP  6022312  1/1994

(Continued)

OTHER PUBLICATIONS

Translation of Paragraphs 2-10 and Figure 8 of Japanese Patent No. JP002288353A (3 pages), Nov. 28, 1990.

*Primary Examiner* — Hoang-Vu A Nguyen-Ba
(74) *Attorney, Agent, or Firm* — King & Spalding L.L.P.

(57) ABSTRACT

A method for information exchange, comprises the steps of producing information transmissions in a broadcast standard; sending the information live from a studio; digitizing the sent data and then transmitting the digitized data via satellite as IP multicast packets; receiving the data by a TV decoder and feeding them into a data and/or communications network; installing software on a data processing equipment, like PCs or workplace computers, in which the software, after the data processing device has been connected to the data and/or communications network, permits receiving of information transmissions and use of at least part of the functions furnished by the information transmission; dialing via a portal to access an information transmission; and using the functions furnished by the information transmission via communications connections between the data processing equipment and studio for an interactive information exchange.

33 Claims, 5 Drawing Sheets

U.S. PATENT DOCUMENTS

| | | | |
|---|---|---|---|
| 7,161,934 B2 * | 1/2007 | Buchsbaum et al. | 370/382 |
| 7,380,260 B1 * | 5/2008 | Billmaier et al. | 725/37 |
| 2002/0131428 A1 | 9/2002 | Pecus et al. | 370/401 |
| 2002/0133405 A1 | 9/2002 | Newnam et al. | 705/14 |

FOREIGN PATENT DOCUMENTS

| | | |
|---|---|---|
| JP | 10228229 | 8/1998 |
| JP | 2001344359 | 12/2001 |
| JP | 2002077861 | 3/2002 |
| JP | 2002140487 | 5/2002 |
| JP | 2002288353 | 10/2002 |
| WO | WO00/70799 | 11/2000 |
| WO | WO01/15427 A2 | 3/2001 |
| WO | WO01/35565 | 5/2001 |
| WO | WO01/99029 | 12/2001 |
| WO | WO02/41527 | 5/2002 |

* cited by examiner

METHOD AND APPARATUS FOR INFORMATION EXCHANGE IN AN INTERACTIVE COMMUNICATION SYSTEM USING TV BROADCAST INFORMATION

Priority

This application claims foreign priority of the German application DE 10250356.7 filed on Oct. 29, 2002 and German application DE 10330362.6 filed Jul. 1, 2003.

BACKGROUND OF THE INVENTION

The invention concerns a method and apparatus for information exchange, as well as a corresponding computer program and a corresponding computer-readable storage medium that can be used, in particular, for setting up company interactive television (iTV), especially a live broadcast system, in which the viewer uses his connected workplace computer to participate.

The continuous rise in the percentage of electronics in complex products, especially in vehicles, and the rapid development of these components are requiring continuous qualifications of employees in the business organization.

SUMMARY OF THE INVENTION

The object of the invention consists of furnishing a method and arrangement for information exchange, as well as a corresponding computer program and a corresponding digital storage medium, which implement direct information transfer or qualification of groups of persons who are at different locations, by using modern communications technology.

This object can be achieved by a method for information exchange, comprising the steps of:
- producing information transmissions in a broadcast standard;
- sending the information live from a studio;
- digitizing the sent data and then transmitting the digitized data via satellite as IP multicast packets;
- receiving the data by a TV decoder and feeding them into a data and/or communications network;
- installing software on a data processing equipment, like PCs or workplace computers, in which the software, after the data processing device has been connected to the data and/or communications network, permits receiving of information transmissions and use of at least part of the functions furnished by the information transmission;
- dialing via a portal to access an information transmission; and
- using the functions furnished by the information transmission via communications connections between the data processing equipment and studio for an interactive information exchange.

Access to an information transmission and/or use of the functions furnished by the information transmission may occur as a function of access authorization. Access to an information transmission may occur after dialing at the portal and call-up of a link for information transmission. Access authorizations may be sent by email and/or an SMS method to a selected group of persons. The TV decoder can feed the received data into a local network, like a local area network (LAN) and/or an audio feedback channel from a data processing unit, like a PC or workplace computer, may be coupled to the production studio of the information transmission via a virtual private network (VPN) separate from the satellite transmission channel. Speech communication may occur as voiceover IP (VoIP) via an audio feedback channel. Playback of the information transmission on the data processing equipment, like PCs or workplace computers, may occur with one or more Web browsers. For playback of information transmissions in a Web browser, several windows, like a window for live presentation of the moderator or teacher in the studio (film window) or a window for presentation of graphics and/or tests (graphics window), can be provided. The windows provided for playback of information transmissions in a Web browser can be sent in full screen representation. The software, after log-on at a portal, can be installed by an initial applet on the data processing equipment or software installed on the data processing equipment is updated after log-on at the portal. The functions provided by the information transmission may include
- execution and/or evaluation of surveys,
- execution and/or evaluation of multiple choice tests (MCT),
- layout, connection and/or management of telephone connections,
- data transmission, especially text transmission, between the data processing equipment and production studio and/or management.

Surveys and/or tests can be designed as HTML-programmed files. A time limitation can be stipulated for processing of surveys and/or tests and after this time elapses, the survey and/or test files are automatically closed for processing. Data and/or files, like text files, sent to the production studio and/or management can be conveyed as email and/or as SMS messages to one or more designatable receivers. The method can be carried out in a computer program which can be downloaded from an electronic data network, like the Internet, to a data processing unit connected to the data network.

The object can also be achieved by a method for information exchange, comprising the steps of:
- producing information transmissions in a broadcast standard wherein the information transmissions include TV information and digital information;
- sending the information live from a studio;
- receiving the information;
- extracting video information and digital information;
- feeding the extracted video and digital information into a data processing equipment and connecting the data processing equipment to a data and/or communication network and accessing a main data processing equipment associated with the studio through the data and/or communication network;
- decoding functions from the extracted digital information; and
- using the functions furnished by the digital information via the established communications connection between the data processing equipment and the studio for an interactive information exchange.

The method may further include the step of authorizing the access to the main data and/or communication equipment associated with the studio. The step of connecting the data processing equipment may include the step of using a dial-up connection. Access authorizations can be sent by email and/or an SMS method to a selected group of persons. A TV decoder may feed the received video and data information into a local network, like a local area network (LAN) and/or an audio feedback channel is sent from a data processing unit, like a PC or workplace computer, to the production studio of the information transmission via a virtual private network (VPN) separate from the satellite transmission channel. Speech communication may occur as voiceover IP (VoIP) via an audio feedback channel. Playback of the video and digital information on the data processing equipment, like PCs or workplace computers, may occur with one or more Web browsers. For playback of video and digital information in a Web browser, several windows, like a window for live presentation of the moderator or teacher in the studio (film window) or a window for presentation of graphics and/or tests (graphics window), can be provided. The windows provided for playback of information transmissions in a Web browser can be sent in full screen representation. The software, after connection to the main data processing equipment, can be installed by an initial applet on the data processing equipment or software installed on the data processing equipment is updated after the connection. The functions provided by the digital information may include execution and/or evaluation of surveys, execution and/or evaluation of multiple choice tests (MCT), layout, connection and/or management of telephone connections, and data transmission, especially text transmission, between the data processing equipment and production studio and/or management. Surveys and/or tests can be designed as HTML-programmed files. A time limitation can be stipulated for processing of surveys and/or tests and after this time elapses, the survey and/or test files are automatically closed for processing. Data and/or files, like text files, sent to the production studio and/or management can be conveyed as email and/or as SMS messages to one or more designatable receivers. The method can be carried out in a computer program which can be downloaded from an electronic data network, like the Internet, to a data processing unit connected to the data network.

The object can also be achieved by an arrangement with at least one processor and/or chip setup so that a method for information exchange can be carried out, comprising means for producing information transmissions in a broadcast standard to be sent live from a studio, a digitizer for digitization of the sent data and the transmission of the digitized data occur via satellite as IP multicast packets, a TV decoder for receiving the IP multicast packets that feeds the received data into a data and/or communications network, means for installing software on the data processing equipment, like PCs or workplace computers, in which the software, after the data processing equipment has been connected to the data and/or communications network, permits receiving of information transmissions and use of at least part of the functions furnished by the information transmission, means for dialing via a portal to access an information transmission, and interactive information exchange means which use the functions furnished by the information transmission via communications connections between the data processing equipment and studio.

The object can further be achieved by a computer program product stored on a computer readable storage medium for, when run on a computer, carrying out a method for information exchange, comprising the steps of:
 producing information transmissions in a broadcast standard;
 sending the information live from a studio;
 digitizing the sent data and then transmitting the digitized data via satellite as IP multicast packets;
 receiving the data by a TV decoder and feeding them into a data and/or communications network;
 installing software on the data processing equipment, like PCs or workplace computers, in which the software, after the data processing device has been connected to the data and/or communications network, permits receiving of information transmissions and use of at least part of the functions furnished by the information transmission;
 dialing via a portal to access an information transmission; and
 using the functions furnished by the information transmission via communications connections between the data processing equipment and studio for an interactive information exchange.

The computer program can be downloaded from an electronic data network, like the Internet, to a data processing unit connected to the data network.

A particular advantage of the method according to the invention consists of the fact that an information exchange can occur in direct dialog between spatially separated participants and with flexibly alternating groups of participants, in which
 information transmissions are produced in a broadcast standard and transmitted live from a studio;
 digitization of the transmitted data and then transmission of the digitized data occur via satellite as IP-multicast packets;
 a TV decoder that feeds the received data to a data and/or communications network serves to receive the IP-multicast packets;
 software is installed in the data process equipment, like PCs or workplace computers, in which the software, after the data processing equipment has been connected to the data and/or communications network, permits receipt of information transmission and use of at least part of the functions furnished by information transmission;
 access to an information transmission occurs by dialing via a portal and
 interactive information exchange occurs by using the functions furnished by the information transmission via communications connections between the data processing equipment and studio.

In a preferred variant of the method according to the invention, it is prescribed that access to an information transmission and/or use of the functions furnished by the information transmission occurs as a function of access authorization. In another variant, it is prescribed that access to an information transmission occurs after dialing at a portal and call-up of a link for information transmission.

In different cases, it can be advantageous to only allow a restricted group of persons to participate in the information transmission (for example, during technical business training). In such cases, it is advantageous that the access authorizations are sent by email and/or a message via SMS to the selected group of persons.

In situations in which information transmission is not supposed to be public, the data received by the TV decoder should not be accessible via a public network, like the Internet. In these cases, it is advantageous if the TV decoder supplies the received data to a local network, like a local area network (LAN).

In another preferred variant of the method according to the invention, it is prescribed that the audio feedback channel is directed from a data processing device, like a PC or workplace computer, to the production studio of the information transmission via a virtual private network (VPN) separated from the satellite transmission channel. Data traffic via the satellite is then relieved and, at the same time, persons not authorized to participate are excluded. In particular, it is advantageous if speech communication occurs as voice over IP (VoIP) via the audio feedback channel. The transmitted data can also be encoded.

In another preferred variant of the method according to the invention, it is prescribed that playback of the information transmissions on the data processing equipment, like PCs or workplace computers, occurs with one or more web browsers. The transmissions, for example, can start in a browser and open additional browsers for graphic depictions or video sequences introduced for explanation. In an alternative variant, it is prescribed that several windows, like a window for live presentation of the moderator or teacher present in the studio (film window) or a window for presenting graphics and/or tests (graphics window), be furnished for playback of information transmissions in a web browser. It is then advantageous if the windows furnished for playback of information transmissions in a web browser be sent in full screen representation. If necessary, this can be conducted by the management.

In order to avoid manual installation or updating of software for receiving and/or using information transmissions on the client side, it has proved to be advantageous if the software, after log-on at the portal, be installed by an initial applet on the data processing equipment or software installed on the data processing equipment is updated after log-on at the portal.

In another preferred variant of the method according to the invention, it is prescribed that the functions furnished via the information transmission include:
  performance and/or evaluation of surveys,
  performance and/or evaluation of multiple choice tests (MCT),
  setup, connection and/or management of telephone connections,
  data transmission, especially text transmission, between the data processing equipment and the production studio and/or management.

It has proven advantageous, in particular, if surveys and/or tests be designed as HTML-program files.

For neutral evaluation of surveys and/or tests, it is advantageous if a time limitation is stipulated for processing of surveys and/or tests and, after this time has elapsed, the survey and/or test files are automatically closed for processing.

In cases, in which questions that occurred in an information transmission, for example, because they were sent by telephone or text transmission (telegram) from a viewer to the moderator, to not be finally answered, it is prescribed in a special variant that data and/or files, for example, text files, transmitted to the production studio and/or management, be conveyed as email and/or as messages via SMS to one or more designatable receivers.

An arrangement according to the invention is advantageously set up so that it includes at least one processor and/or chip that is set up so that a method for information exchange can be carried out, in which
  information transmissions are produced in a broadcast standard and transmitted live from a studio;
  digitization of the transmitted data and then transmission of the digitized data occur as IP multicast packets via satellite;
  a TV decoder that supplies the received data to a data and/or communications network is used to receive the IP multicast packets;
  software is installed on the data processing equipment, like PCs or workplace computers, in which the software, after the data processing equipment has been connected to the data and/or communications network, permits receipt of the information transmissions and use of at least part of the functions furnished by a information transmission;
  access to an information transmission occurs by dialing via a portal and
  interactive information exchange occurs by using the functions furnished by the information transmission via communications connections between the data processing equipment and studio.

A computer program according to the invention for information exchange permits a computer, after it has been loaded into the memory of the computer, to carry out a method for information exchange, in which
  information transmissions are produced in a broadcast standard and transmitted live from a studio;
  digitization of the transmitted data and then transmission of the digitized data occurs as IP multicast packets via satellite;
  a TV decoder that feeds the received data into a data and/or communications network is used to receive the IP multicast packet;
  software is installed on the data processing equipment, like PCs or workplace computers, in which the software, after the data processing equipment has been connected to the data and/or communications network, permits receipt of the information transmissions and use of at least part of the functions furnished by an information transmission;
  access to an information transmission occurs by dialing via a portal and
  interactive information exchange occurs by using the functions furnished by the information transmission via communications connections between the data processing equipment and studio.

For example, these computer programs (for a fee or free of charge, freely accessible or password-protected) can be furnished downloadable into a data or communications network. The computer programs so furnished can then be made usable by a method, in which a computer program is downloaded from an electronic data network, like the Internet, to a data processing device connected to the data net.

In order to execute a method for information exchange, a computer-readable storage medium is advantageously used, on which a program is stored that permits a computer, after it has been loaded into the memory of the computer, to execute a method for information exchange, in which
  information transmissions are produced in a broadcast standard and transmitted live from a studio;
  digitization of the transmitted data and then transmission of the digitized data occurs as IP multicast packets via satellite;
  a TV decoder that feeds the received data into a data and/or communications network is used to receive the IP multicast packet;
  software is installed on the data processing equipment, like PCs or workplace computers, in which the software, after the data processing equipment has been connected to the data and/or communications network, permits receipt of the information transmissions and use of at least part of the functions furnished by an information transmission;
  access to an information transmission occurs by dialing via a portal and
  interactive information exchange occurs by using the functions furnished by the information transmission via communications connections between the data processing equipment and studio.

The iTV system permits direct exchange between employees of commercial organizations and the manufacturer. iTV thus permits cost-effective and continuous qualification of employees. With consistent use of iTV, optimization of the error elimination process (with respect to time and cost) is achieved.

The iTV system therefore has the following advantages, in particular:
- no investments in the business;
- VHS image quality in full screen mode, the recording standard is Betacam SP or a comparable radio standard, in order to ensure this minimal quality;
- no manual software installation at the business;
- use of standard Web technology;
- participation in an iTV transmission must be possible from each (technically suitable) workplace computer;
- transmission of electronic video documents from the business to the iTV editorial staff can be optionally suppressed.

BRIEF DESCRIPTION OF THE DRAWINGS

The invention is further explained below in practical examples with reference to the accompanying drawings. In the drawings.

DETAILED DESCRIPTION OF THE PREFERRED EMBODIMENTS

Figure 1:
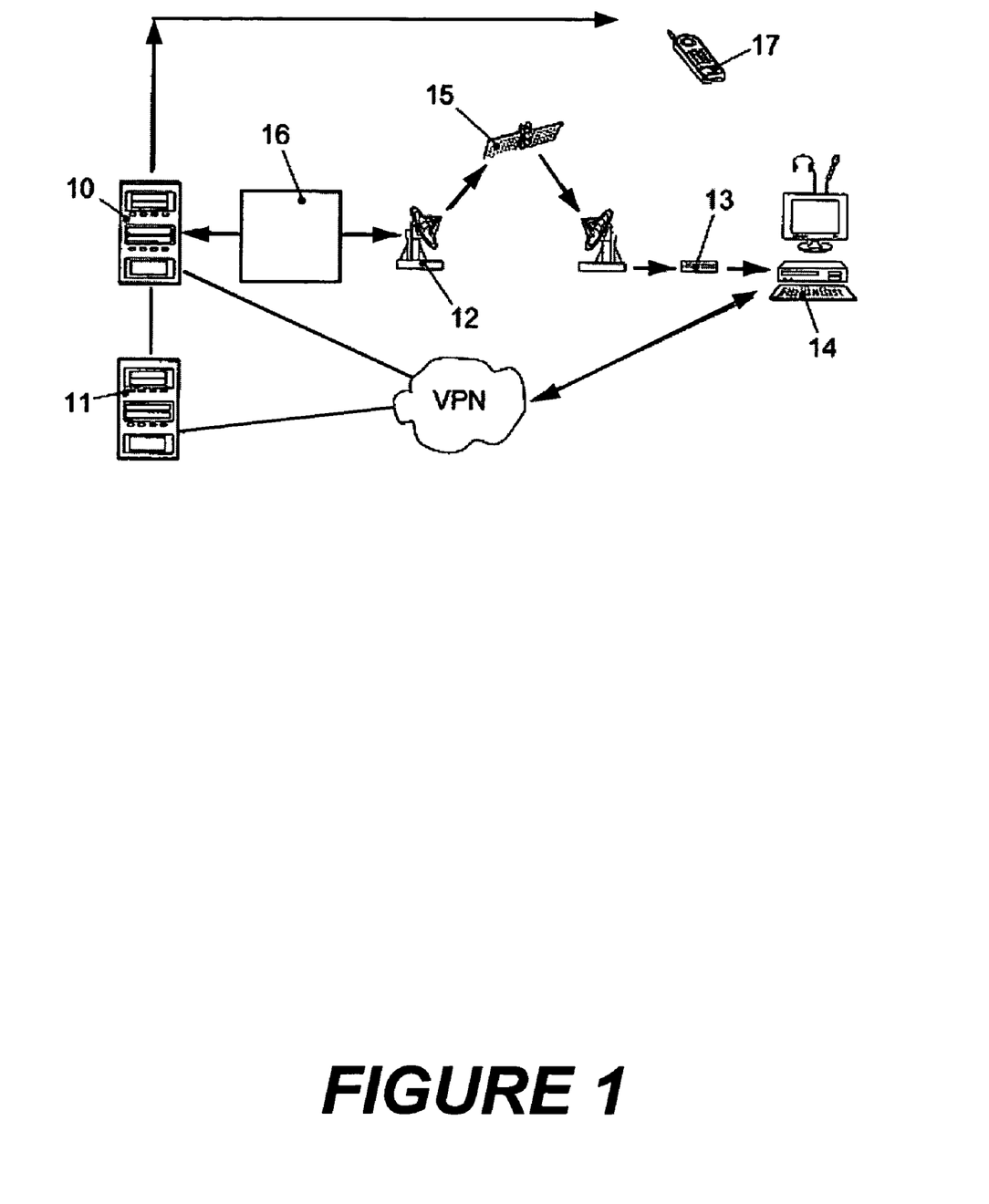
FIG. 1 shows components of the iTV system.

The information will be described subsequently, using an interactive TV as example (iTV). As shown in FIG. 1, the special practical example is a live broadcast system, in which the viewer uses his connected workplace computer to participate. The examples of methods for information exchange, as well as the structure of the arrangement for information exchange implemented as a live broadcast system and cooperation of the individual modules of this system, are further described below, in which the structure of the arrangement implemented as a live broadcast system is additionally explained by FIGS. 4 and 5.

Figure 4:
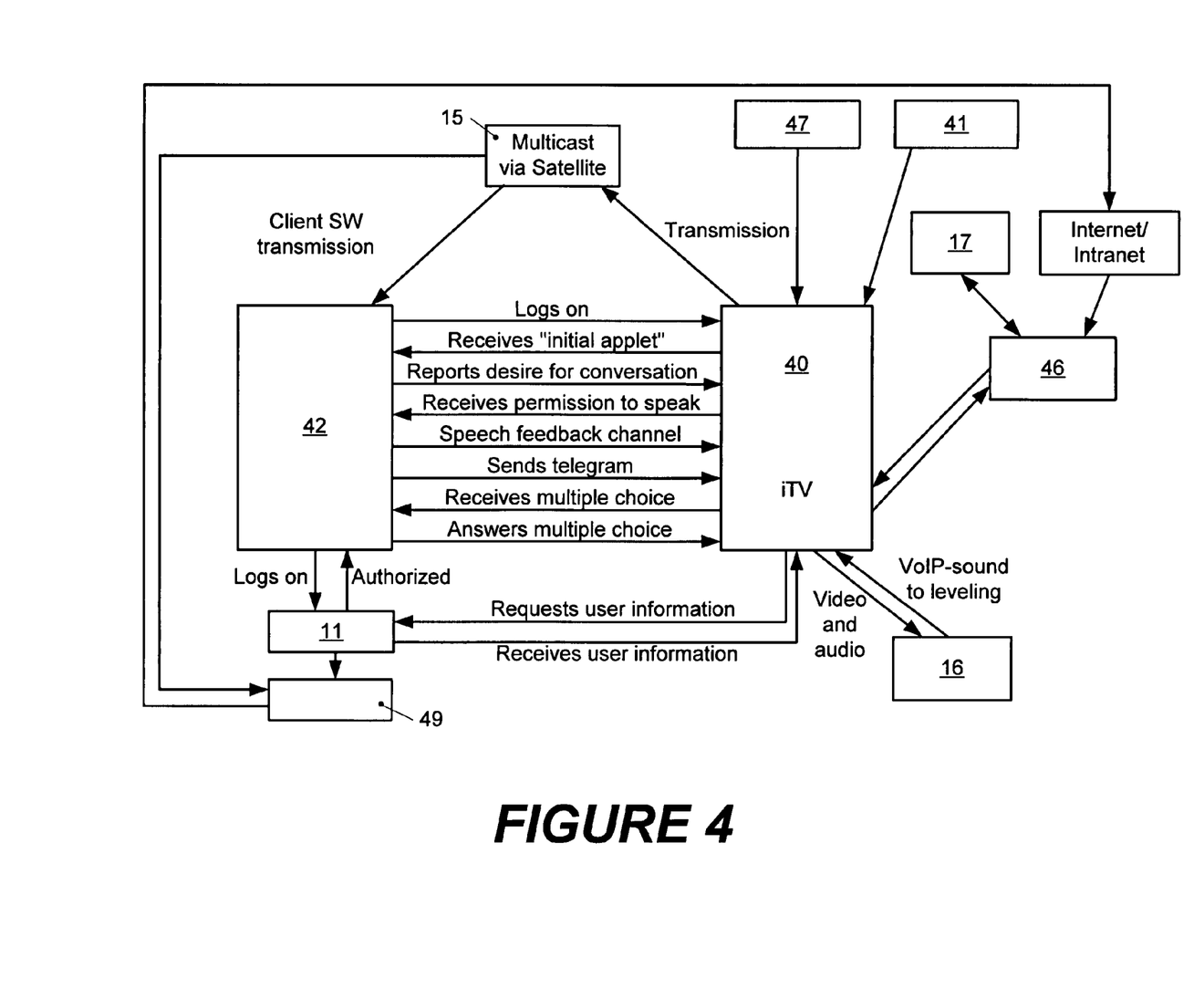
FIG. 4 shows a contact diagram of the iTV system and
FIG. 5 shows a system overview.

Target groups of such an interactive company television are the employees of the company
- in the partner operations (dealer);
- in the marketing centers;
- in the production plants;
- in the supplier plants and
- with importers A moderator 41 stands in front of the camera and provides information to participants 42 at their workplaces by means of films, slides and graphs. The participants 42 can participate live in the transmission via a speech and data feedback channel. This interactive medium permits real-time training of employees. Even during the iTV transmission, the teacher 41, for example, can question the stated knowledge of the participants via multiple choice tests and react accordingly to them.

Figure 5:
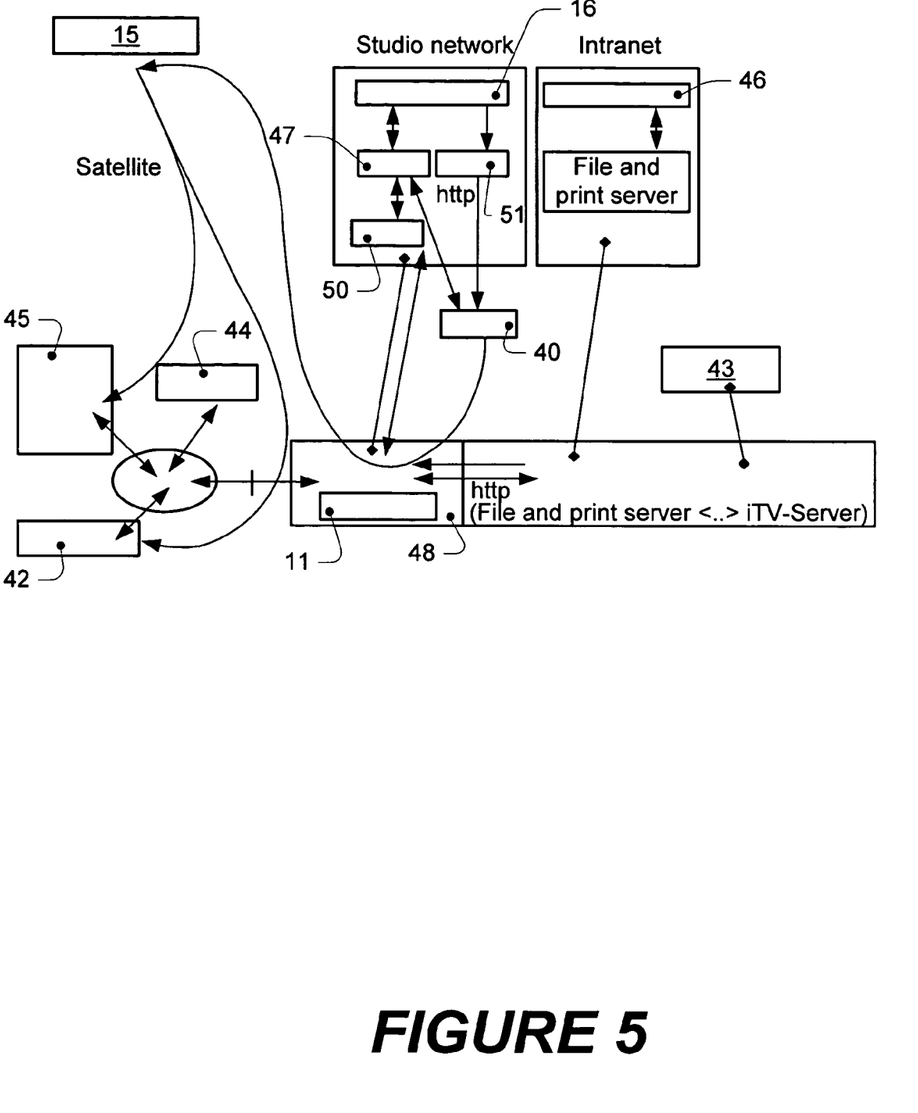

The iTV program is produced in a special implementation of the invention in a television studio 16. The program is broadcast via satellite 15 and can be received by the TV decoder 13. The program reaches the workplace computers 14 of the employees via the local network of the company. The PC of the participants becomes the dialog instrument: the viewer can speak to the moderator 41 in iTV studio 16 via a headset. The VPN (virtual private network) is used for the audio feedback channel.

The iTV system shown as an example is based on Web technology and presentation occurs in the browser. Participation in the transmission is subject to an access authorization concept. Authorization occurs after checking of rights and requires log-on at portal 11.

The general layout of the iTV transmission will be described first:

The iTV Transmissions

It has proven advantageous for the different contents that can be sent through information transmissions, like
- rapid, current information of the viewer and information acquisition for experts,
- presentation of several subjects by different experts,
- exchange of opinions between several representatives of different target groups or
- interactive training transmission to give each its own transmission format.

Requirements on the Transmission Formats for iTV

The number of transmission formats is guided according to the content tasks that each transmission is supposed to fulfill. The format is first influenced by the statement of the task. The concept of the transmission, for example, can prescribe that it meets a training task or is supposed to inform in timely and rapid fashion. Secondly, the target group is decided. The transmission format therefore differs, depending on whether the transmission is directed to the employees 43 of the manufacturer of the complex product and to employees 44 at suppliers or to the service employees 45 at the partner operations.

The content of the transmission also has an effect on the transmission format. Complicated content should be sent, understandably, with a journalistic form of presentation, for example, with interviews, films, moderation or roundtables.

All transmissions have a clearly defined structure, their own screen design, an understandable language, all are prepared, produced and transmitted by the iTV editorial staff 46 (they are therefore recognized as iTV transmissions). Each expert, who would like to appear in the transmission, must prepare his contents, together with the editorial staff 46, and send it in the format of the corresponding transmission.

For all subjects, at the present time, five transmission formats can be defined for iTV:
1. Expert transmission
2. Moderated expert transmission
3. Roundtable discussion
4. Training transmission
5. Computer system training The transmission formats one to three are information transmissions, the transmissions four and five are subsequently referred to as training transmissions.

Viewers and Information Suppliers

In order to optimize the quality of iTV transmission, persons from special, different areas/business arts advantageously work together to produce the transmission and introduce their special knowledge. Depending on the objective of the transmission, employees from the following groups and locations/operation sites can therefore participate in production.

For example, the following listed groups can participate at the following locations/operating parts:

For example, the following listed groups can participate at the following locations/operating parts:
- product support at manufacturer locations,
- quality assurance at manufacturer locations,
- research and development at manufacturer locations, suppliers everywhere in the footprint of a HOT BIRD 3™ system,
dealers everywhere in Germany,
marketing centers at the corresponding locations,
importers everywhere in the footprint of a HOT BIRD 3™ system.

These groups can be both viewers 42 and information suppliers in an iTV transmission. A main aspect, for example, can lie in technical subjects that are sent via iTV.

The subjects are also "interactive". This means both the information supplier and the viewers 42 profit from the knowledge or questions of the others.

Requirements on Film and Transmission Quality

In the context of information transmission, techniques and products are presented, among other things. This places high requirements on technical video quality, since details are often shown on engines or other components that the viewer must easily recognize. The prerequisite for this is production of the program in a professional broadcast standard.

The peculiarities of the individual transmission formats are briefly explained below.

The Expert Transmission
Objective:
  Rapid, current information of the viewer 42 and information acquisition for experts.
Information Characteristics:
  current product information,
  instructions on partial components of the product, especially of the vehicle,
  presentation of new tools.
  The transmission is monothematic, i.e., only one subject is presented and discussed.
Moderation:
  The expert stands alone in front of the camera. He is technically competent and presents his subject alone and unfiltered. He must be able to present his subject understandably and according to the stipulations of iTV editorial staff 46. He is immediately available to viewers 42 as information supplier. In dialog, the viewers 42 and expert acquire additional knowledge for their daily work.
Structure of the Transmission:
1. Greeting
2. Presentation of the subject with films, pictures and/or graphics
3. Experience exchange with viewers 42
4. Summary
5. Farewell
  The transmissions last a maximum of 20 minutes.

The Moderated Expert Transmission
  The moderated expert transmission, relative to the expert transmission just described, has some differences.
  In the moderated expert transmission, several subjects are presented by different experts. The moderator 41 carries out the transmission and guides the experts through the transmission. The moderated transmission, however, can also be monothematic with only one expert in studio 16. For example, this can be required in particularly complex subjects, or in order to support an inexperienced expert in the presentation.
  The transmission time is a maximum of 30 minutes.
Layout of the Transmission:
1. Greeting by moderator 41
2. Presentation of the discussion partners
3. Presentation of the first subject in dialog between moderator 41 and experts, with films, pictures and/or graphics
4. Experience exchange with viewers 42
5. Transfer to the next subject
6. Presentation of the second subject
7. Experience exchange with viewers 42
8. Summary
9. Farewell
Moderation:
  The transmission is presented by a professional television moderator or professional female moderator. The moderator 41 presents the different subjects, interviews the experts and guides the discussion with viewers 42. His task is to control the course of the transmission. For example, it matters to comply with the transmission times for different subjects and to moderate the change from one subject to the next.
Roundtable Discussion:
Objective:
  An exchange of opinion between several representatives of different participating target groups. The objective is simultaneous knowledge transfer between many target groups. One subject should be discussed in solution-oriented fashion. The roundtable discussion is led by a professional television moderator 41.
  The transmission length lies between 30 and 60 minutes.
Information Characteristics:
  current product information
  instructions on special components of the product, especially of the vehicle
  presentation of new tools
  The subjects that can be taken up in the context of a roundtable discussion are extremely varied. They can go far beyond the aforementioned scheme. Regular discussion forums with the service managers and company managers of dealers, concerning introduction of a product on the market or other subjects, are conceivable here.
Moderation:
  A maximum of five guests are in front of the camera. A moderator 41 leads the roundtable discussion, asks questions, assumes the role of critical view of 42, ensures that the subject is not flogged to death. He ensures communication with the viewers 42 at their workplaces, and ensures that they acquire appropriate answers to their questions. He summarizes at the conclusion of the transmission and ensures that the transmission is not overrun.
Structure of the Transmission:
1. Greeting by the moderator 41
2. Presentation of the subject, with played films, images and/or graphics
3. Discussion of the studio guests with the viewers 42, with played films, images and/or graphics
4. Summary of the moderator 41
5. Farewell by the moderator 41
Training Transmission
  However, interactive training transmission at regular intervals can also be held by iTV application 40. The viewers 42 take a short test in the context of training and receive a certificate that they have participated in training.
  The transmission time lies between 30 and 60 minutes.
Information Characteristics:
  The training subjects can concern, for example, a specific product. They can also be customer service- and sales-relevant subjects.
Moderation:
  Training is conducted by a teacher 41 of the corresponding technical department. The teacher 41 should receive thorough instructions in the procedure and method of operation of iTV training. Since the variety of subjects is very large, all potential iTV teachers should receive general instruction in the iTV project. Right before transmission, they must then receive instruction in work with the medium iTV. Operation of teachers-dialog, communication with the editorial staff 46 and management 47 during the transmission, etc.

Structure of the Transmission:
1. Greeting by the teacher 41
2. Interactive training, with played films, images and/or graphics, as well as multiple choice tests during the transmission
3. Transfer of the teacher 41 into the examination part of the training transmission
4. Testing
5. Summary and farewell by the teacher 41

The training transmission differs in one essential point from the information transmission: its transmission procedure is supplemented by its own test part. After the end of interactive training, the teacher 41 announces a test.

A final test is sent to the viewers 42 and they must then solve the examination tasks in a defined period. After the stipulated time has elapsed, this test is completed, the file is sent to the central office, evaluated and the viewer 42 receives his certificate online.

Computer System Training

Special training occurs in computer system training. In the context of computer system training, PC systems via iTV are taught.

Operator Surfaces

Viewer Dialogs

Viewer Dialog for Information Transmissions

For information transmissions, it is practical to give a large space in the playback window transmission on the workplace computer 14 to the film window with the live presentation of the moderator 41 or teacher 41 in the studio at 16. The playback window is opened in a special variant of the invention in a Web browser.

In addition to the film window, yes/no, question and telegram buttons are furnished to the viewer 42 for dialog. This dialog permits a present depiction of the teacher 41 and the played films, because of the large film window. The management 47 can switch the film window at any time to a full screen depiction. However, they can also decide to remain in the dialog mode, with the objective of permitting continuous communication between the viewer 42 and teacher 41.

Yes/No Buttons

With these buttons, the teacher 41 can direct closed questions to the public 42 or conduct surveys. A question posed by the teacher 41 can be answered by the dealer 42 with yes or no by pressing the corresponding button. The buttons are blocked until release by the director 47. The viewer 42 obtains, after pushing the button, a visual confirmation (YES: the button becomes green; NO: the button becomes red). After pressing, these buttons are blocked. And until they are released again until the manager 47 (for example, during a new inquiry). The results of the survey are displayed in the control dialogs of teacher 41 and the manager 47.

Question Button

The viewer 42 presses a question button, when he wants to speak to the teacher 41 through his headset. The button text changes to "Please wait . . . ", so that the viewer 42 recognizes that the transmission management 47 is informed.

Until viewer 42 is switched through by management 47, the client program sends a single ping to the iTV server 10 every 20 seconds, in order to maintain the VPN connection.

When the viewer 42 can proceed to transmit, he is switched through by the transmission management 47. The button text in the viewer dialog changes "Please wait . . . " to "Please speak . . . ". At the same time, the viewer 42 receives a signal tone. After the conversation, the phrase "Question" again appears on the button. The viewer 42 can again express his questions. The viewer 42 can withdraw his desire for conversation at any time. For this purpose, he clicks once on the "Please wait . . . " button.

Telegram

The viewer 42 has the possibility of communicating his question or opinion to the teacher 41 via a telegram. This text message is a maximum of 1000 characters long. The viewer 42 clicks on the "Telegram" button. Beneath the button, a text entry field opens up. A scroll bar is present on the right side and a button with the inscription "Send". After clicking on the corresponding button, he receives a confirmation, when the message reaches the transmission management. A signal tone sounds and the info: "Telegram received at iTV central office" appears. The text entry field then closes again.

If, during text entry of a telegram, a switch is made from the management 47 into the full screen representation, the viewer 42 must have the opportunity to write and send off his telegram. For this purpose, the text entry field remains in the foreground of the screen.

Viewer Dialog for Training Transmissions

Figure 2:
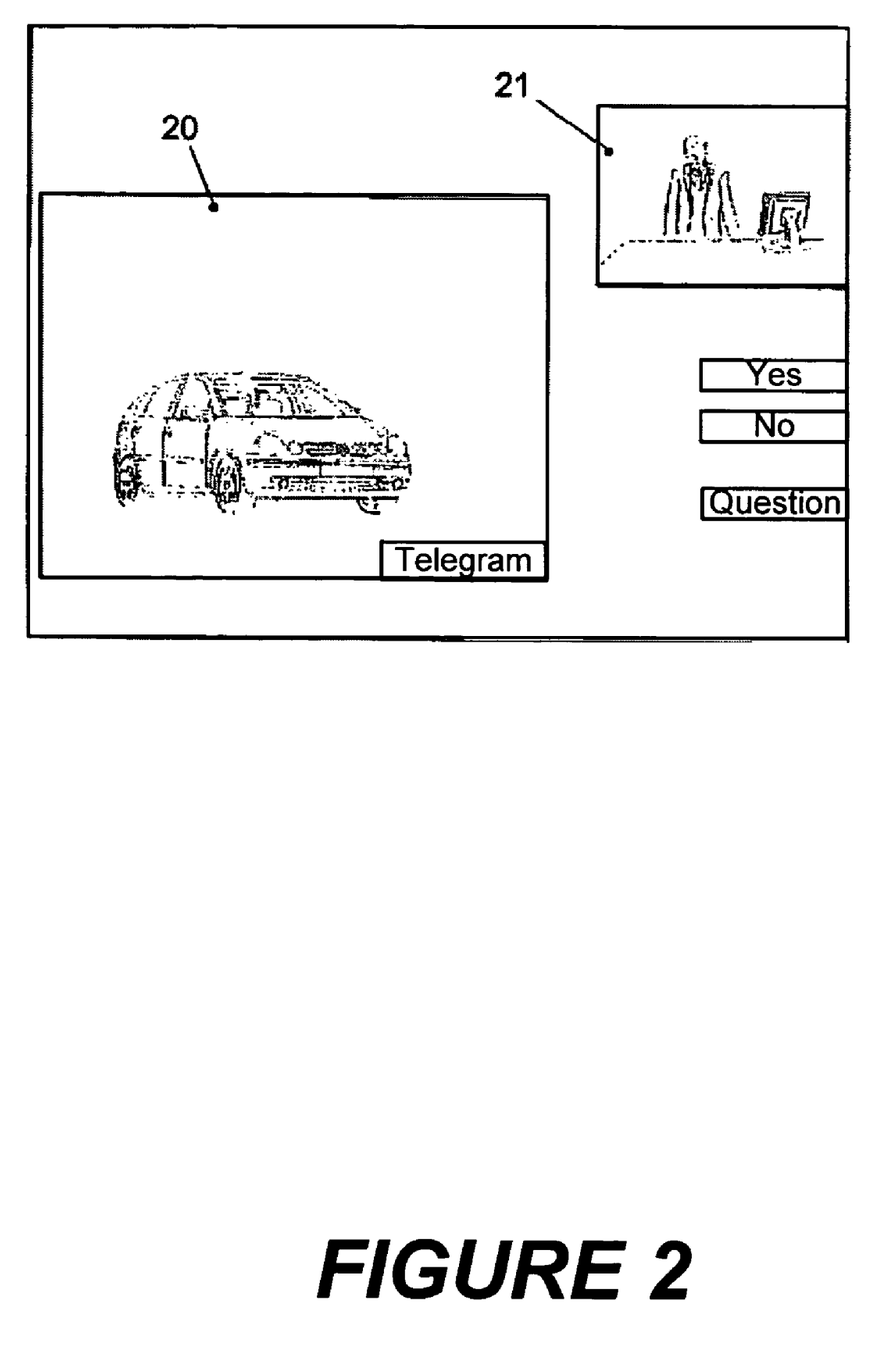
FIG. 2 shows a viewer dialog for training transmissions.

On the right top of film window 21 (cf. FIG. 2), teacher 41 appears. His presentation is supported by graphics and text that appear in the graphics window 20 on the left side. These objects are also transmitted by satellite 15 and presented synchronously with the presentation. In a special variant of the invention, it can be prescribed that the graphics are transmitted in their own independent channel. This dialog can be switched at any time by management 47 to the full screen mode (both film window 21 and graphics window 20). The director 47 can also decide to switch from training dialog to information dialog. This is reasonable in transmission phases, in which graphics are not being used, but communication with the teacher 41 should nevertheless be possible.

Logout/Close Window

The viewer 42 terminates the application by closing the iTV window with the Window-Close button. Closure is sensed by the software, so that an explicit report to the central office is made (billing and viewer quota).

Control Dialogs

The iTV transmissions are controlled by a responsible editor 46 and a director 47. This occurs by means of a control dialog that is situated on the computers at management 47 and in studio 16. In addition, the teacher 41 has the possibility of carrying out his information or training transmission himself. The teacher's dialog, however, is more simply configured.

Two control dialogs are distinguished below teacher's dialog management dialog

Control monitors are ignored here. It is only mentioned that the teacher 41 can follow all films shown during the transmission on his own video monitor in his own moderation desk.

The course of communication between the trainees and the teachers, in simplified fashion, runs as follows:

Questions go to the management dialog, are conveyed to the audio mixing desk and released via the headset of the teacher.

Telegrams, via the management dialog, are sent to the teacher's dialog and there issued or stored in a file system.

Yes/No run to the teacher's dialog or management dialog and are released through the teacher's dialog or emitted as results.

Multiple choice questions go to the teacher's dialog or management dialog and are released via the teacher's dialog or the results are transmitted.

The course of communication applies for all transmission formats.

Arrangement of Workplaces in Studio 16 and Management 47

For the arrangement of workplaces of moderator/teacher 41 and management 47 in one variant, a division of these workplaces between studio 16 and management 47 is provided. In this case, the teacher's workplace (teacher's dialog) and management workplace 1 (management dialog) are situated in studio 16 and the management workplaces 2 and 3 (management dialog) in management 47.

The presence of an editor in studio 16 (management workplace 1) gives the teacher 41 a feeling of security. In addition, the editor 46 can be involved as a partner, live in the transmission. For example, he can receive telegrams live. Depending on the length and demand of the transmission, an iTV transmission can proceed from one or more management dialogs. In costly productions, the following personnel arrangement is conceivable.

Management workplace 1 is manned by an editor 46, who is exclusively concerned with communication with viewers 42, receives telegrams, selects them and reads them after announcement from the management 47. He is also concerned with accepting questions, selects and conveys them to the audio mixing desk.

Management workplace 2 is manned by the responsible editor 46 of the transmission, as well as a responsible individual from the technical service center. Both ensure content plausibility of the transmission and intervene when the transmission must be switched for content reasons.

Management workplace 3 is the position of the screen. From here, the transmission is technically controlled according to the transmission schedule.

Figure 3:
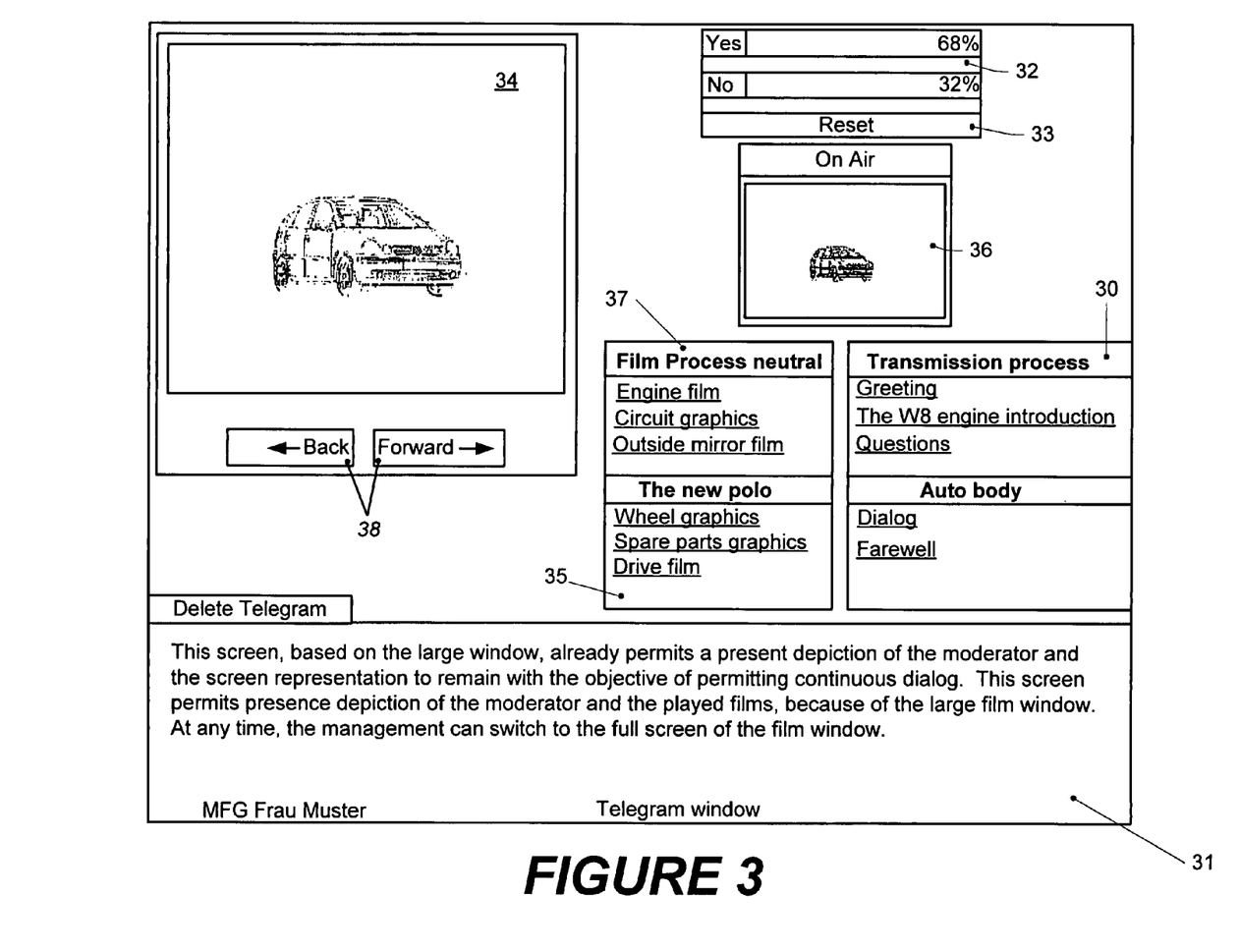
FIG. 3 shows a teacher's dialog.

Teacher's Dialog (cf. FIG. 3)

The teacher 41 can largely control the course of the transmission himself from his monitor. He determines, according to a graphics plan worked out beforehand, when which graphic is sent. Editor 46 and the video mixer support him from management 47 and can intervene at any time, since the management dialog has all the functionalities of the teacher's dialogs. Editor 46, teacher 41 and video mixer together determine how the transmission is controlled.

The teacher 41 can see, in the transmission process window 30, which point of the transmission schedule he has reached. He sees whether a film follows or whether a video graphic must be played. He sees whether a round of questions is scheduled in the transmission, or whether the end of the transmission is approaching, and he can wrap up the transmission. These data are obtained from management 47. Employed films and video graphics appear on his control monitor in the moderation desk. Their use is displayed in the transmission process window 30.

In the telegram window 31, the questions that the responsible editor 46 convey to teacher 41 are displayed. The window has a scroll bar. In addition, the text field contains a delete button, if the teacher 41 does not wish to answer the questions. If he deletes the question, a corresponding message goes to management 47. The editor 46 can then present a new telegram.

In the yes/no window 32, the result of the inquiry made of teacher 41 among viewers 42 is indicated in percent. The results can be reset via an additional "Reset" button 33 (also in the management dialog).

In graphics window 34, the teacher 41 sees which film he wants to present. The films of this transmission are in graphics format. The teacher 41 controls use of films and multiple choice tests.

The teacher 41 can control his use of graphics with the film process window 35. With a click on the films listed there, he can display the next film in graphics window 34. With a double-click on the window, he can transmit the film. It then also appears in the "On Air" window 36. The editor 46 or director also has this function, so that he can intervene during mistakes. In the upper region of the film bar, a "Neutral" button 37 is provided. With a double-click on this button, the teacher 41 can fade in the neutral film, which is transmitted immediately.

With the Advance and Back buttons 38, the teacher 41 can repeat films or click to the next film. These then appear in the graphics window 34 and are immediately "on air".

Multiple choice tests are also displayed in the graphics window 34. The HTML-program pages contain the question, the possible answers, as well as the check boxes for the answers. Teacher 41 sends this page with a double-click. It then also appears in the "On Air" window 36. It is open for a predetermined time (for example, 30 seconds) in the viewer dialogs. Once the time has elapsed, the window closes. If the viewer 42 has given his answer, the result is transmitted to studio 16. The check boxes are then blocked. The multiple choice page, however, still remains visible on the viewer dialog as long as the official question time lasts. The result of the test automatically appears in the graphics window 34 of the teacher's dialog. The result is sent to the viewer 42 with a double-click on the graphics window 34.

The multiple choice test is treated like any other film. This means that the video image is faded in again. If necessary, the management 47, during the test, can display the graphics window 34 as a full screen.

The data for multiple choice tests and graphics are transmitted almost simultaneously for presentation to the client, if the viewer 42 has connected just before presentation of the multiple choice test or graphics. By a command, that is also contained in the multicast stream, the graphics or multiple choice tests are only displayed in the window. In data transmission by multicast, redundancy should be integrated, so that the loss of individual packets does not mean that a graphic cannot be displayed.

Management Dialog

All transmission formats can be controlled with the management dialog. This dialog has all the functionalities of the teacher's dialog and includes additional functions, like the Screen button.

Management Dialog:

Like the teachers' dialog, the management dialog also has a telegram key. In the "Telegram" field, the director 47 can recognize who has sent the telegram. With a click on the sender, the telegram is visible in a text field with a scroll bar. The telegram is sent from management 47 for content checking to teacher 41 and disappears from the list. If the teacher 41 has erased a telegram, the button "continue" blinks. The management 47 can then send a new telegram to the teacher. Moreover, a telegram of the teacher's dialog, in principle, is overwritten when a new one is sent from the management 47 to teacher 41. All telegrams are stored and, after transmission, are sent to the teacher 41 by email. The telegrams are then deleted from the database.

In addition, a "call list" is prepared in the management dialog. In the "call list" field, the desire for conversation is indicated. The director 47 sees the name and origin of the caller. The first "call" is at the very top in the caller list. All later caller desires are indicated beneath it. The director 47 can select in the caller list the one he wishes to send to the teacher 41. He does this by double-clicking on the name. The name line changes its color and becomes red. With another double-click, the director 47 can terminate the conversation. The name of the caller disappears from the list. The director 47 can delete any caller from the list.

With the "Screen" buttons, the director 47 scan switch between the two viewer dialogs. He can start a transmission, for example, with the viewer dialog for information transmissions, and then change to the viewer dialog for training transmissions.

The buttons with the addition VB (full screen) enable the management 47 to change to the full screen representation. The director 47 can display both the film window, in which the teacher 41 can be seen, and also the graphics window in full screen. The full screen representation is eliminated by means of "Screen" buttons.

Each transmission format imposes different requirements on the control dialogs. It should therefore be possible to place certain function fields or buttons out of use. The fields then appear on the video screen, but with a gray background.

The Administrator Dialog

An administrator dialog is necessary for configuration of the control dialogs. The following work takes place via this dialog:
  selection of transmission format
  definition of a target group for a specific transmission
  sending of invitation by email 17 to the target group
  user management of the iTV system (administrators, management, teachers)
  import of graphics, text (for example, for graphics procedure and transmission procedure, etc.)
  preparation of multiple choice tests
  entry of parameters (for example, time for multiple choice tests, etc.)
  readout of data of logged on viewers 42
  preparation of transmission and graphics lists
  preparation of text fade ins during and before transmissions
  management of all data stored during a transmission
  presentation of viewer rate Layout Organization/Process Model Setup of iTV Users in Portal 11

Management of users occurs centrally, for example, by an organization of a business division. Access to a transmission is regulated via a parameter (role) "iTV-authorized".

Invitation to iTV Transmissions

For invitation to transmissions for a specific target group, it is necessary to define the following roles:
Business:
  iTV-authorized
  service technician
  service advisor
  manager
  salesman
  sales manager
  manufacturer
Importer/Supplier/Marketing Center
  iTV-authorized
  design employee
  electrical employee
  motor/transmission employee
  drive train employee The roles of business are defined in a special variant in portal 11, and additional roles are supplied here in their own user database of the iTV application. Portal iTV-user database equalization occurs via the identical user name.

A distinction of the user according to affiliation to the manufacturer, importer, supplier and marketing center (type of organization) is also possible.

For this purpose, the methods of portal 11 are expanded, so that a search according to the above mentioned roles is possible. As a result, USER-ID, GIVE-AME, SURNAME, BRANDNAME, BRANDS, BRAND-ID, ROLES, ROLE, ORGANIZATION, ORGTYP, MOBIL, E-MAIL are required as a result.

Log-on at Portal 11

By logging on a portal 11 and call-up of the link for iTV, transmission on a Web server to iTV server 10 occurs. The parameter of this URL is a token that is used for authentication via the XML interface of portal 11.

The affects of simultaneous log-on of all iTV participants within a few minutes before the beginning of a transmission must be considered from a network and server standpoint.

Installation Client-Software

Call-up of the iTV application 40 occurs by logging on at portal 11. Because of this, an initial applet (max. 400 KB) is started, so that the actual iTV client software is received and installed via multicast. If the client software is already installed by previous use, it is then updated as required. For this purpose, it is necessary that the client software be sent about 15 minutes before a transmission with maximum bandwidth by satellite 15. During the transmission, the software is also sent narrow-band.

If log-on at portal 11 is to be started at a time when transmission is not carried out, then the start screen appears with the mention of the next transmission, when the client software is already installed. Information concerning the next transmission is obtained by the client from a central server.

If the client software is still not installed, the receiving component is then downloaded. Installation of the client software cannot occur, since it is not transmitted by satellite 15. The start screen nevertheless appears with indication of the next transmission.

After successful log-on, the microphone input of the sound card is prepared:
  activation of the microphone input as recording device
  adjustment of the recording level to an average value Course of Transmission It is checked during transmission whether the participant is authorized, based on his role and organizational affiliation, to see the actual transmission. If this is not the case, an error message appears.

Final Processing of a Transmission

After an iTV transmission, all telegrams of the transmission can be sent to the experts with sender information (name, handler, email address, telephone number) and time stamp by email.

Filing iTV transmissions, if required, can be filed on the iTV server 10 as a stream. There must be a possibility of retransmitting filed transmissions or presentation to a client.

In addition, sent transmissions to the reference client can be filed with the TV-out-output of the graphics card in studio 16 on a video tape.

Data Model

The data to the viewers are taken from the description of the XML interface of portal 11. Additional attributes, like additional roles, can be defined in analog fashion.

User Surface

The user dialogs were already described in the section "Operating surfaces".

It should be generally noted that all dialogs and error messages are given in the national language of the user. In the start phase, German and English are to be implemented, but simple expansion to other languages must be provided.

Error messages and warnings receive a distinct error numbering in the format "iTVnnnnE" (error messages) or "iTVnnnnW" (warning) and are fully documented and explained in a "Support" handbook. "nnnn" is the placeholder for a four-digit numerical error number.

Description of the Help System:
- The corresponding functionality is faded in as help text (Hints), if the mouse pointer is above a button (for example, "Yes", "No", "Speak", "Telegram").
- The standard screen resolution is established according to the operating concept as screen resolution for the viewer dialog (now 800×600 pixels). The iTV application can start from this resolution as minimal resolution, but the depiction must also function under higher resolutions.
- If a user switches to the iTV application at a time when no multicast stream is being sent yet, a predefined image is displayed in the video window in a graphics format. This image can contain, for example, indications of the beginning of transmission, etc.
- The image is updated by the central office and loaded in the CPN (=central partner network) 48 during start of the client software by a central server.

Interface Concept

Portal 11

In order to limit access to iTV and to guarantee distinct identifiability of the viewers, log-on is recommended. This task is assumed by the already present portal 11.

By logging on at portal 11 and call-up of the link iTV, a switch is made to an iTV Web server 10. The parameter of this URL is a token that is used for authentication via the XML interface of portal 11.

For all iTV transmissions, there must be a possibility of loading the desired target group by email or SMS 17. For this purpose, the loading module 49 is used. For this purpose, it is necessary that the methods of portal 11 be expanded, so that a search according to the aforementioned roles is possible. As a result, USER-ID, GIVENAME, SURNAME, BRANDS, BRAND, BRAND-ID, ROLES, ROLE, ORGANIZATION, ORGTYP, MOBIL, E-MAIL are required.

By logging on at portal 11, the client receives from iTV Web server 10 the IP multicast address and the required ports to receive the multicast data.

If the user declines participation on receiving a transmission, a corresponding error message is released at the client.

Through the access authorization concept on the transmission level, the target group is to be defined for each transmission in the iTV system:

Roles Business (Get User Rules):
  service technician
  service advisor
  manager
  salesman
  sales manager
  manufacturer
Roles Manufacturer/Importer/Supplier/Sales Center (New):
  design employee
  electrical employee
  engine/transmission employee
  drivetrain employee
Organizational Type (GetOrgTypesData):
  internal manufacturer
  importer
  supplier
  sales center
Tone (VoIP Feedback Channel)

During an iTV transmission, the listener should be given the opportunity to pose questions to the moderator 41 or expert. For this purpose, in a preferred variant, a voiceover IP connection (VoIP) is used. This connection is implemented via the available network connection (VPN, Framerelay, not VSAT), for example, between dealers and the studio 16.

The VoIP data stream is based on UDP packets, because of the real time requirement, and is scaleable in bandwidth (and therefore in quality). A sound quality capable of transmission is achieved by adaptation of the bandwidth, if necessary.

Relatively high requirements are presumed on the quality of the data connection for the VoIP feedback channel, since language transmissions can only occur in acceptable quality when all the VoIP packets reach the objective at uniform spacings.

A user has a question during a transmission. He sends this to the central system via a button. An editor 46 receives this inquiry there. The caller receives speech authorization and a processed audio signal is sent through to studio 16. All participants 42 receive the conversation via the stream. To avoid feedback and echoes, corresponding measures are provided by the iTV.

The VoIP data are decoded at the central location by a VoIP decoder 50 and sent to the mixing desk by a computer via the sound card. Level adjustment occurs there. Since no possibility for communication with the participant 42 from management 47 is possible, level adjustment can only occur after speech authorization has been granted!

For possible prioritization of VoIP data, these are to be transmitted so they can be clearly identified by the routers.

Multicast

The video and audio signals are digitized by an encoder 51 in studio 16, sent to the central iTV server 10 and from there sent, together with the control signals and graphics, as multicast. The encoder 51 should support at least the formats MPEG 1 and MPEG 4 with data rates between 200 and 1700 Mbits/s. A VHS quality should also be guaranteed in the full screen mode.

Video and iTV data are sent via satellite 15 as IP multicast packets.

For this purpose, a dedicated IP connection is available between the iTV server 10 and the satellite uplink 12. The multicast data are tunneled by the routers as unicasts up to the satellite uplink 12 and sent there as multicasts.

Security

Access Rights

Access to iTV 40 is regulated via access rights. The following user classes can be distinguished:
  Administrators
  System
  Per organization unit
  Studio team
  Management
  Teacher
  Viewer
  Dealer
  Sales center
  Importer
  Supplier
  Manufacturer employee Authentication of the user occurs through portal 11. Access rights are issued based on roles from portal 11 or the iTV user database.

Protection from Unauthorized Access

Encryption

The distribution of the iTV transmission occurs via satellite 15 and is not public. The multicast data must also often be accessible on the Internet, although they are only intended for certain user groups, based on role. Encryption of the data is therefore to be provided at the application levels, which effectively prevents decoding of the data. The data are additionally encoded during satellite transmission.

The invention is not restricted in its variant to the aforementioned preferred practical examples. A number of variants are instead conceivable, which make use of the arrangement according to the invention and the method according to the invention even in fundamentally differently configured designs.

We claim:

1. A method for information exchange, comprising the steps of:
    operating an information exchange system including a production studio coupled to remote data processing equipment by both (a) a satellite connection and (b) a non-satellite connection separate from the satellite connection;
    producing information transmissions in a broadcast standard, the information transmissions including (a) a real-time video stream and (b) non-video content;
    sending the information transmissions live from the production studio;
    digitizing the sent information transmissions and then transmitting the digitized information transmissions via the satellite connection as IP multicast packets;
    receiving the information transmissions by a TV decoder and feeding them into a data and/or communications network for delivery to the remote data processing equipment;
    extracting the real-time video stream and non-video content from the received information transmissions;
    displaying the information transmissions received via the satellite connection at a display device of the remote data processing equipment, including displaying both (a) the satellite-transmitted real-time video stream and (b) the satellite-transmitted non-video content;
    receiving via a user input of the remote data processing equipment user interaction with the satellite-transmitted non-video content displayed at the display device of the remote data processing equipment; and
    transmitting the user interaction with the satellite-transmitted non-video content from the remote data processing equipment to the production studio via the non-satellite connection, such that a real-time interactive communication is established between the satellite-transmitted information transmission and the non-satellite-transmitted user interaction.

2. The method according to claim 1, wherein access to an information transmission and/or use of the functions provided by the information transmission occurs as a function of access authorization.

3. The method according to claim 2, wherein access authorizations are sent by email and/or an SMS method to a selected group of persons.

4. The method according to claim 1, wherein access to an information transmission occurs after access to the portal and call-up of a link for information transmission.

5. The method according to claim 1, wherein the non-satellite connection between the production studio coupled to remote data processing equipment comprises a virtual private network (VPN) separate from the satellite connection.

6. The method according to claim 1, wherein speech communication occurs as voiceover IP (VoIP) via an audio feedback channel.

7. The method according to claim 1, wherein playback of the information transmissions on the remote data processing equipment, occurs with one or more Web browsers.

8. The method according to claim 1, wherein, for playback of information transmissions in a Web browser, multiple windows are provided.

9. The method according to claim 8, wherein the windows provided for playback of information transmissions in a Web browser are sent in full screen representation.

10. The method according to claim 1, wherein software, after log-on at a portal, is installed by an initial applet on the remote data processing equipment or software installed on the remote data processing equipment is updated after log-on at the portal.

11. The method according to claim 1, wherein the functions provided by the information transmissions include:
    execution and/or evaluation of surveys,
    execution and/or evaluation of multiple choice tests (MCT),
    layout, connection and/or management of telephone connections,
    data transmission, especially text transmission, between the remote data processing equipment and production studio and/or management.

12. The method according to claim 11, wherein surveys and/or tests are designed as HTML-programmed files.

13. The method according to claim 11, wherein a time limitation is stipulated for processing of surveys and/or tests and after this time elapses, the surveys and/or tests are automatically closed for processing.

14. The method according to claim 1, wherein data and/or files sent to the production studio and/or management are conveyed as email and/or as SMS messages to one or more designatable receivers.

15. The method according to claim 1, wherein the method is carried out in a computer program which can be downloaded from an electronic data network to a data processing unit connected to the data network.

16. The method according to claim 1, wherein, for playback of real-time video TV information and non-video digital content in a Web browser, multiple windows are provided.

17. The method according to claim 16, wherein the windows provided for playback of information transmissions in a Web browser are sent in full screen representation.

18. An arrangement with at least one processor and/or chip setup, so that a method for information exchange can be carried out, comprising:
    means for producing information transmissions in a broadcast standard to be sent live from a production studio, the information transmissions including (a) a real-time video stream and (b) non-video content;
    a digitizer for digitization of the sent information transmissions and for the transmission of the digitized information transmissions via a satellite connection as IP multicast packets;
    a TV decoder remote from the production studio for receiving the IP multicast packets that feeds the received IP multicast packets into a data and/or communications network for delivery to remote data processing equipment;
    extraction means of the remote data processing equipment for extracting the real-time video stream and non-video content from the received information transmissions;
    a display device of the remote data processing equipment that displays the information transmissions received via the satellite connection, including displaying both (a) the satellite-transmitted real-time video stream and (b) the satellite-transmitted non-video content;
    a user input of the remote data processing equipment that receives user interaction with the satellite-transmitted non-video content displayed at the display device of the remote data processing equipment;

means for transmitting the user interaction with the satellite-transmitted non-video content from the remote data processing equipment to the production studio via a non-satellite connection separate from the satellite connection, such that a real-time interactive communication is established between the satellite-transmitted information transmission and the non-satellite-transmitted user interaction.

19. A computer program product stored on a non-transitory computer readable storage medium for, when run on a computer, carrying out a method for information exchange, comprising the steps of:

producing information transmissions in a broadcast standard, the information transmissions including (a) a real-time video stream and (b) non-video content;

sending the information transmissions live from a production studio;

digitizing the sent information transmissions and then transmitting the digitized information transmissions via a satellite connection as IP multicast packets;

receiving the IP multicast packets by a remote TV decoder and feeding them into a data and/or communications network for delivery to remote data processing equipment;

extracting the real-time video stream and non-video content from the received information transmissions;

displaying the information transmissions received via the satellite connection at a display device of the remote data processing equipment, including displaying both (a) the satellite-transmitted real-time video stream and (b) the satellite-transmitted non-video content:

receiving via a user input of the remote data processing equipment user interaction with the satellite-transmitted non-video content displayed at the display device of the remote data processing equipment; and transmitting the user interaction with the satellite-transmitted non-video content from the remote data processing equipment to the production studio via non-satellite connection such that a real-time interactive communication is established between the satellite-transmitted information transmissions and the non-satellite-transmitted user interaction.

20. The computer program product according to claim 19, wherein the computer program can be downloaded from an electronic data network to a data processing unit connected to the data network.

21. A method for information exchange, comprising the steps of:

producing information transmissions in a broadcast standard wherein the information transmissions include real-time video TV information and non-video digital content;

sending the information transmissions live from a production studio to a remote TV decoder via a satellite connection;

receiving the information transmissions at the remote TV decoder;

extracting the real-time video TV information and non-video digital content from the information transmissions;

feeding the extracted real-time video TV information and non-video digital content; into remote data processing equipment coupled to the remote TV decoder and connecting the remote data processing equipment to a data and/or communication network and accessing a main data processing equipment associated with the production studio through the data and/or communication network;

displaying the information transmissions received via the satellite connection at a display device of the remote data processing equipment, including displaying both (a) the satellite-transmitted real-time video TV information and (b) the satellite-transmitted non-video digital content;

receiving via a user input of the remote data processing equipment user interaction with the satellite-transmitted non-video digital content displayed at the display device of the remote data processing equipment; and transmitting the user interaction with the satellite-transmitted non-video digital content from the remote data processing equipment to the production studio via a non-satellite connection separate from the satellite connection, such that a real-time interactive communication is established between the satellite-transmitted information transmission and the non-satellite-transmitted user interaction.

22. The method according to claim 21, further including the step of authorizing the access to the main data and/or communication equipment associated with the production studio.

23. The method according to claim 22, wherein access authorizations are sent by email and/or an SMS method to a selected group of persons.

24. The method according to claim 21, wherein the step of connecting the remote data processing equipment includes the step of using a portal connection.

25. The method according to claim 21, wherein non-satellite connection between the production studio coupled to remote data processing equipment comprises a virtual private network (VPN) separate from the satellite connection.

26. The method according to claim 21, wherein speech communication occurs as voiceover IP (VoIP) via an audio feedback channel.

27. The method according to claim 21, wherein playback of the real-time video TV information and non-video digital content on the remote data processing equipment, occurs with one or more Web browsers.

28. The method according to claim 21, wherein software, after connection to the main data processing equipment, is installed by an initial applet on the remote data processing equipment or software installed on the remote data processing equipment is updated after the connection.

29. The method according to claim 21, wherein the functions provided by the digital information include execution and/or evaluation of surveys, execution and/or evaluation of multiple choice tests (MCT), layout, connection and/or management of telephone connections, data transmission, especially text transmission, between the data processing equipment and production studio and/or management.

30. The method according to claim 29, wherein surveys and/or tests are designed as HTML-programmed tiles.

31. The method according to claim 29, wherein a time limitation is stipulated for processing of surveys and/or tests and after this time elapses, the survey and/or test files are automatically closed for processing.

32. The method according to claim 21, wherein data and/or files, like text tiles, sent to the production studio and/or management arc conveyed as email and/or as SMS messages to one or more designatable receivers.

33. The method according to claim 21, wherein the method is carried out in a computer program which can be downloaded from an electronic data network, like the Internet, to a data processing unit connected to the data network.

* * * * *